(12) United States Patent
Bailey et al.

(10) Patent No.: US 11,562,003 B2
(45) Date of Patent: *Jan. 24, 2023

(54) REPRESENTING SEARCH RESULTS VIA A THREE-DIMENSIONAL MATRIX

(71) Applicant: INTERNATIONAL BUSINESS MACHINES CORPORATION, Armonk, NY (US)

(72) Inventors: Kelly Bailey, San Francisco, CA (US); Raphael L. Bouchard, Austin, TX (US); Elizabeth A. Jensen, San Antonio, TX (US); Emma L. Verrecchia, Banbury (GB)

(73) Assignee: International Business Machines Corporation, Armonk, NY (US)

( * ) Notice: Subject to any disclaimer, the term of this patent is extended or adjusted under 35 U.S.C. 154(b) by 439 days.

This patent is subject to a terminal disclaimer.

(21) Appl. No.: 16/531,300

(22) Filed: Aug. 5, 2019

(65) Prior Publication Data

US 2019/0361920 A1 Nov. 28, 2019

Related U.S. Application Data

(63) Continuation of application No. 14/711,757, filed on May 13, 2015, now Pat. No. 10,417,259.

(51) Int. Cl.
*G06F 16/28* (2019.01)
*G06F 16/248* (2019.01)
(Continued)

(52) U.S. Cl.
CPC .......... *G06F 16/285* (2019.01); *G06F 16/248* (2019.01); *G06F 16/24573* (2019.01);
(Continued)

(58) Field of Classification Search
CPC .. G06F 16/285; G06F 16/9038; G06F 16/248; G06F 16/9535; G06F 16/24573; G06F 16/24578
See application file for complete search history.

(56) References Cited

U.S. PATENT DOCUMENTS 5,966,126 A 10/1999 Szabo
6,985,898 B1 * 1/2006 Ripley .................. G06F 16/338
707/999.005
(Continued)

FOREIGN PATENT DOCUMENTS

WO 0242940 A1 5/2002
WO WO-2007033354 A2 * 3/2007 ............. G06T 15/00

OTHER PUBLICATIONS

Josh Lowensohn, CNET, "Search Cube Scours Google in 3d", https://www.cnet.com/tech/services-and-software/search-cube-scours-google-in-3d/ Apr. 13, 2009. (Year: 2009).*
(Continued)

*Primary Examiner* — Neveen Abel Jalil
*Assistant Examiner* — Hubert Cheung
(74) *Attorney, Agent, or Firm* — The Steadman Law Firm PLLC

(57) ABSTRACT

An approach is described for representing search results via a three-dimensional matrix. An associated method may include receiving a search query, querying at least one database based upon the search query, and receiving results to the search query from the at least one database. The method further may include representing the results via a three-dimensional matrix graphically depicting a plurality of categories corresponding to the results. Each of the plurality of categories may be associated with the results via a respective tag in the at least one database. Upon detecting activity from an input device, the method further may include filtering the plurality of categories of the three-
(Continued)

dimensional matrix, and prioritizing the results based upon the filtering. Representing the results via the three-dimensional matrix may include presenting the results in a list correlated to the three-dimensional matrix, and prioritizing the results based upon the filtering may include prioritizing the list.

15 Claims, 13 Drawing Sheets

(51) Int. Cl.
 G06F 16/9535 (2019.01)
 G06F 16/2457 (2019.01)
 G06F 16/9038 (2019.01)

(52) U.S. Cl.
 CPC .... *G06F 16/24578* (2019.01); *G06F 16/9038* (2019.01); *G06F 16/9535* (2019.01)

(56) References Cited

U.S. PATENT DOCUMENTS

| | | | |
|---|---|---|---|
| 7,730,059 | B2 | 6/2010 | Behnen et al. |
| 7,853,603 | B2 | 12/2010 | Churin et al. |
| 7,921,379 | B1* | 4/2011 | Ko .................. G06F 16/954 715/834 |
| 8,131,779 | B2 | 3/2012 | Jonker et al. |
| 8,352,465 | B1 | 1/2013 | Jing et al. |
| 8,402,382 | B2 | 3/2013 | Agarawala et al. |
| 8,473,855 | B2 | 6/2013 | Hogan et al. |
| 8,498,984 | B1 | 7/2013 | Hwang et al. |
| 9,081,830 | B1* | 7/2015 | Stolte .................. G06F 16/248 |
| 9,183,672 | B1* | 11/2015 | Hickman ............. G06T 17/00 |
| 2005/0091596 | A1* | 4/2005 | Anthony ............. G11B 27/34 715/848 |
| 2008/0155426 | A1 | 6/2008 | Robertson et al. |
| 2008/0243778 | A1* | 10/2008 | Behnen .............. G06F 16/283 |
| 2009/0063464 | A1* | 3/2009 | Chang ................ G06F 16/951 707/999.005 |
| 2009/0119262 | A1* | 5/2009 | Guo .................... G06F 16/40 |
| 2010/0057645 | A1 | 3/2010 | Lauritsen |
| 2010/0076960 | A1 | 3/2010 | Sarkissian et al. |
| 2010/0318929 | A1* | 12/2010 | Hilton .................. G06T 11/60 715/848 |
| 2010/0333024 | A1 | 12/2010 | Chan |
| 2011/0055203 | A1* | 3/2011 | Gutt .................... G06F 16/54 715/848 |
| 2011/0122125 | A1 | 5/2011 | Yoon |
| 2011/0225521 | A1* | 9/2011 | Cicecki ............. G06F 16/9577 715/760 |
| 2012/0054687 | A1* | 3/2012 | Kawabata ........... G06F 16/951 715/836 |
| 2012/0096041 | A1* | 4/2012 | Rao .................... G06F 16/9535 707/E17.098 |
| 2013/0014016 | A1 | 1/2013 | Delgo et al. |
| 2013/0041896 | A1 | 2/2013 | Ghani et al. |
| 2013/0054555 | A1 | 2/2013 | Guha et al. |
| 2013/0097554 | A1* | 4/2013 | Wyeld ................ G06F 3/04815 715/782 |
| 2013/0106830 | A1 | 5/2013 | de Loera et al. |
| 2013/0117260 | A1 | 5/2013 | Barrett et al. |
| 2013/0268522 | A1* | 10/2013 | Barrett .............. G06F 16/24578 707/723 |
| 2014/0019842 | A1* | 1/2014 | Montagna ............... G06F 40/18 715/227 |
| 2014/0195515 | A1* | 7/2014 | Baker ..................... G06F 16/26 707/722 |
| 2014/0344264 | A1* | 11/2014 | Kenna ............... G06F 16/90328 707/731 |
| 2015/0347558 | A1* | 12/2015 | Blaas .................... G06F 16/285 707/738 |
| 2015/0356093 | A1* | 12/2015 | Abbas ................. G06F 3/04883 707/748 |
| 2017/0235446 | A1 | 8/2017 | Stolte et al. |
| 2018/0173767 | A1* | 6/2018 | Langseth .............. G06F 16/248 |

OTHER PUBLICATIONS

Lowensohn, Josh. Search Cube scours Google in 3D. CNET.com, Apr. 13, 2009. [2 printed pages] <http://www.cnet.com/news/search-cube-scours-google-in-3d>.
Fance, Charnita. 5 Amazing Visual Search Engines. BloggingTips. com, Jan. 28, 2012 [7 printed pages] <http://www.bloggingtips.com/2012/01/28/5-amazing-visual-search-engines>.
Bazzano, Daniele. Top Visual Search Engines: The Most Interesting Ways To Visually Explore Search Engine Results. MasterNewMedia, Apr. 20, 2009. [18 printed pages] <http://www.masternewmedia.org/top-visual-search-engines-the-most-interesting-ways-to-visually-explore-search-engine-results/#ixzz2ni1AhMLJ>.
Agarwal, Amit. Navigate Google Search Results as a 3D Cube. Digital Inspiration: Tech a la carte, Jan. 14, 2009. [2 printed pages] <http://www.labnol.org/internet/google-search-results-in-3d-cube/6530>.
Dermody, Jack. Visualizing Search Results in 3D (Hybrid Smart Client). Code Project, May 18, 2009. [7 printed pages] <http://www.codeproject.com/Articles/36543/Visualizing-Search-Results-in-3D-Hybrid-Smart-Clie>.
Alger, Jeremy. Search cube "a unique 3D search engine". EDJUDO, Apr. 14, 2011. [2 printed pages] <http://edjudo.com/search-cube-a-unique-3d-search-engine.html>.
Sors, Marco. 3D future scenario for Google search results. Coderwall, Sep. 9, 2012. [9 printed pages] <https://coderwall.com/p/b_6-mw/3d-future-scenario-for-google-search-results>.
Dandekar, Omkar et al. FPGA-based real-time 3D image preprocessing for image-guided medical interventions. Journal of Real-Time Image Processing, Jun. 2, 2007, vol. 1, Issue 4, pp. 285-301, Springer-Verlag: Berlin Heidelberg.
Wiza, Wojciech et al. AVE—Method for 3D Visualization of Search Results. ICWE 2003, Oviedo, Spain, Jul. 14-18, 2003, LNCS vol. 2722, pp. 204-207, Springer-Verlag: Berlin Heidelberg.
List of IBM Patents or Patent Applications Treated as Related, Aug. 5, 2019. [2 pages].

\* cited by examiner

REPRESENTING SEARCH RESULTS VIA A THREE-DIMENSIONAL MATRIX

BACKGROUND

The various embodiments described herein generally relate to processing search results. More specifically, the various embodiments describe techniques for representing search results via a three-dimensional matrix.

Conventional results of a search query generally may be difficult to interpret or prioritize. Possible filters associated with the query may be unintuitive, and a user often must provide substantial feedback in order to categorize the results. Furthermore, with conventional search tools, multiple queries often must be performed and/or multiple filters must be applied in succession in order to obtain results consistent with user preferences.

SUMMARY

The various embodiments of the invention provide techniques for representing search results via a three-dimensional matrix. An associated method may include receiving a search query, querying at least one database based upon the search query, and receiving results to the search query from the at least one database. The method further may include representing the results via a three-dimensional matrix that graphically depicts a plurality of categories corresponding to the results. Each of the plurality of categories may be associated with the results via a respective tag in the at least one database. One or more portions of the three-dimensional matrix may assume the form of one of a cube or a rectangular prism. Upon detecting activity from an input device, the method further may include filtering the plurality of categories of the three-dimensional matrix, and prioritizing the results based upon the filtering. Representing the results via the three-dimensional matrix may include presenting the results in a list correlated to the three-dimensional matrix, and prioritizing the results based upon the filtering may include prioritizing the list.

In an embodiment, filtering the plurality of categories of the three-dimensional matrix may include graphically de-emphasizing by a designated amount a category relative to other categories among the plurality of categories. In a further embodiment, filtering the plurality of categories of the three-dimensional matrix may include graphically emphasizing by a designated amount a category relative to other categories among the plurality of categories. According to a further embodiment, filtering the plurality of categories of the three-dimensional matrix may include focusing display of the three-dimensional matrix upon a category among the plurality of categories and (optionally) any sub-categories associated with the category. According to a further embodiment, filtering the plurality of categories of the three-dimensional matrix may include graphically adjusting by a designated amount a category relative to other categories among the plurality of categories based upon a corresponding adjustment of a range associated with the category.

An additional embodiment includes a computer program product including a computer readable storage medium having program instructions embodied therewith, wherein the program instructions may be executable by a computing device to cause the computing device to perform one or more steps of above recited method. A further embodiment includes a system having a processor and a memory storing an application program, which, when executed on the processor, performs one or more steps of the above recited method.

BRIEF DESCRIPTION OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1:
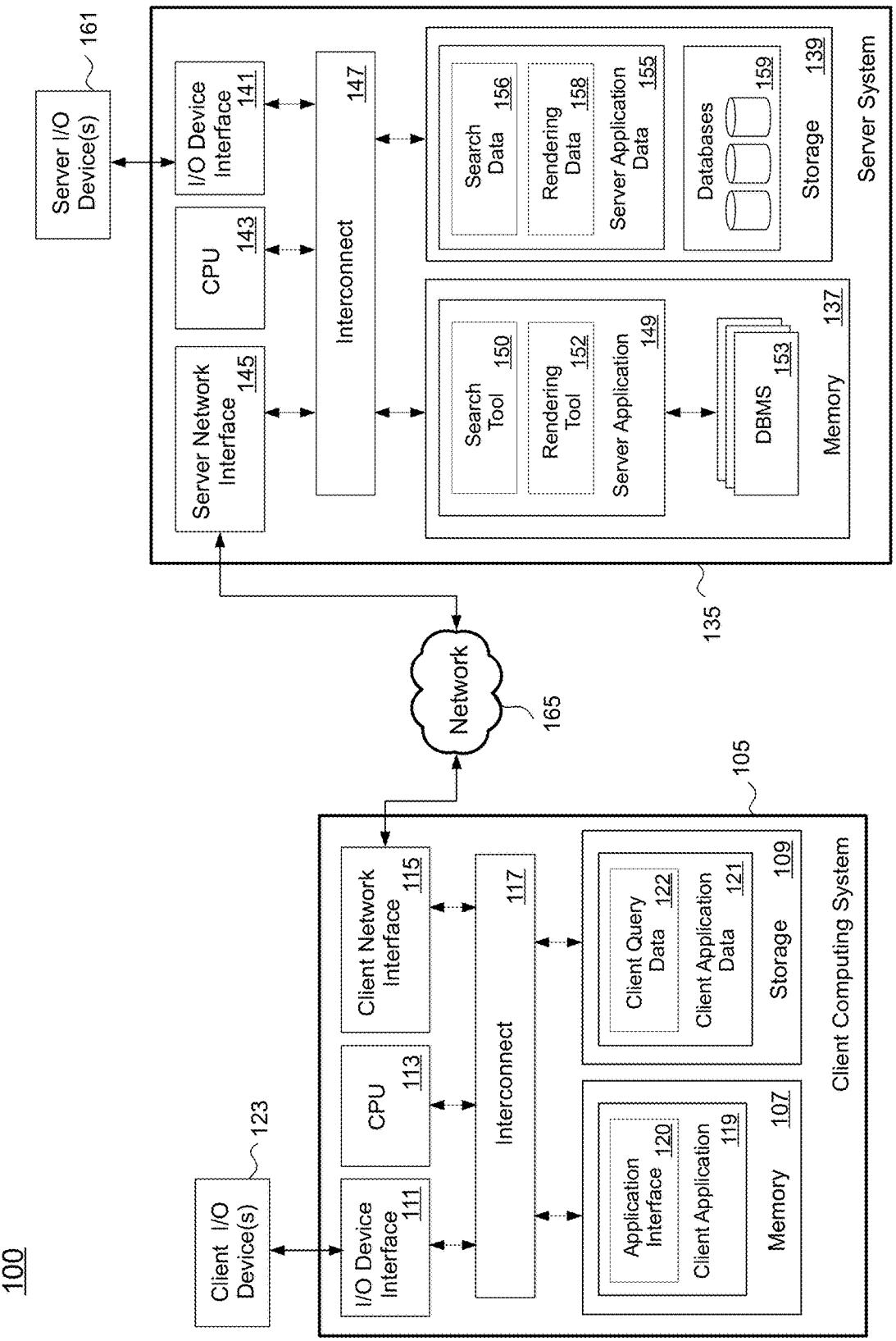
FIG. 1 illustrates a computing infrastructure, according to an embodiment.

The various embodiments described herein are directed to techniques for representing search results via a three-dimensional matrix. The three-dimensional matrix may include categories corresponding to the search results. Additionally, the three-dimensional matrix may permit filtering of the categories via an input device so that the results may be prioritized according to user preference.

The various embodiments described herein may have advantages over conventional techniques of processing search results. Specifically, providing a three-dimensional matrix according to the various embodiments may enable graphical representation of a range of categories based upon the language of a search query and associated with the results of the search query. Additionally, providing a three-dimensional matrix according to the various embodiments may enable control of search result categories on a continuum, as one or more categories within the matrix may be graphically manipulated by a designated amount relative to other categories within the matrix in response to user input. Some of the various embodiments may not include all such advantages, and such advantages are not necessarily required of all embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments and advantages are merely illustrative and are not considered elements or limitations of the appended claims except where explicitly recited in a claim(s) Likewise, reference to "the invention" shall not be construed as a generalization of any inventive subject matter disclosed herein and shall not be considered to be an element or limitation of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The various embodiments described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in the cloud, without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of this disclosure, workloads of a client computing system or server system running an application according to the various embodiments described herein may be deployed to a computing cloud. Moreover, cloud-based database systems, virtual machines, and a variety of other server applications may be used to manage such workloads.

Further, particular embodiments describe techniques for graphically depicting results of a search query via a three-dimensional matrix. However, it should be understood that the techniques described herein may be adapted to a variety of purposes in addition to those specifically described herein. Accordingly, references to specific embodiments are included to be illustrative and not limiting.

FIG. 1 illustrates a computing infrastructure 100 according to an embodiment. As shown, computing infrastructure 100 includes a client computing system 105 and a server system 135, each of which may be connected to a communications network 165.

Illustratively, client computing system 105 may include a memory 107, storage 109, input/output (I/O) device interface 111, a central processing unit (CPU) 113, and a client network interface 115, all of which may be interconnected via interconnect 117 (e.g., a bus). Although shown as a single computing system, client computing system 105 is included to be representative of a single client or multiple clients. In an embodiment, client computing system 105 may be a thin client. In a further embodiment, client computing system 105 may be a mobile device (e.g., a cellular telephone or a tablet device). Memory 107 may include a client application 119. Client application 119 may be a browser application or another application having connectivity to the Internet or another network via communications network 165. Client application 119 may interface with server system 135 and other computing systems via client application interface 120. Client application interface 120 may be a browser or other online interface. Search queries may be completed via client application interface 120. Storage 109 may include client application data 121 associated with client application 119. Client application data 121 may include client query data 122. Client query data 122 may include a search log and/or other statistical information with respect to search queries completed by a user of client computing system 105. Client query data 122 additionally may include data or statistics with respect to results of the search queries, including three-dimensional matrix renderings representing such results. I/O device interface 111 may be communicatively coupled to one or more client I/O devices 123. CPU 113 is included to be representative of a single CPU, multiple CPUs, a single CPU having multiple processing cores, and the like. Client network interface 115 may receive data from and may transmit data to server system 135 or another computing system via network 165.

Server system 135 may include a memory 137, storage 139, I/O device interface 141, a CPU 143, and a server network interface 145, all of which may be interconnected via interconnect 147 (e.g., a bus). Although shown as a single computing system, server system 135 is included to be representative of a single server system or multiple server systems. Memory 137 may include a server application 149. The server application 149 may be an online application for addressing search queries received from client computing system 105 or other computing systems. Server application 149 may include search tool 150 and rendering tool 152. Search tool 150 may process results of a search query according to the various embodiments further described herein. Specifically, search tool 150 may process and represent search results via a three-dimensional matrix within client application interface 120. Rendering tool 152 may facilitate creation of such three-dimensional matrix. In an alternative embodiment, rendering tool 152 may be a sub-component or a constituent function of search tool 150. As illustrated in FIG. 1, server application 149 may interface with a database management system (DBMS) 153, which also is included in memory 137. DBMS 153 is included be representative of a single database system or multiple database systems. Storage 139 may include server application data 155 and databases 159. Server application 149 may generate and process server application data 155 based upon interaction with client computing system 105. Server application data 155 may include search data 156, which may be generated and processed via search tool 150. Server application data 155 further may include rendering data 158, which may be generated and processed via rendering tool 152. Server application 149 (and/or search tool 150 included therein) may send database requests (including search query requests) to DBMS 153, and server application 149 may process results returned by DBMS 153 to generate server application data 155. DBMS 153 may include a software application configured to manage databases 159. Databases 159 may include one or more relational databases. Additionally, databases 159 may include one or more ontology trees or other ontological structures. In the context of the various embodiments described herein, server application 149 may receive query results from databases 159 and may store such results in server application data 155. While FIG. 1 illustrates three databases 159, computing infrastructure 100 may include any number of databases. According to an embodiment, DBMS 153 may send requests to remote databases (not shown) via network 165. Furthermore, server application 149 may interface with at least one of a discussion forum, a social network, a product marketplace, or a weblog.

I/O device interface 141 may be communicatively coupled to one or more server I/O devices 161. CPU 143 is included to be representative of a single CPU, multiple CPUs, a single CPU having multiple processing cores, and the like. Server network interface 145 may receive data from and transmit data to client computing system 105 via network 165. Specifically, server application 149 may accept requests sent by client computing system 105 to server system 135 and may transmit data to client computing system 105 or other computing systems via server network interface 145.

Figure 2:
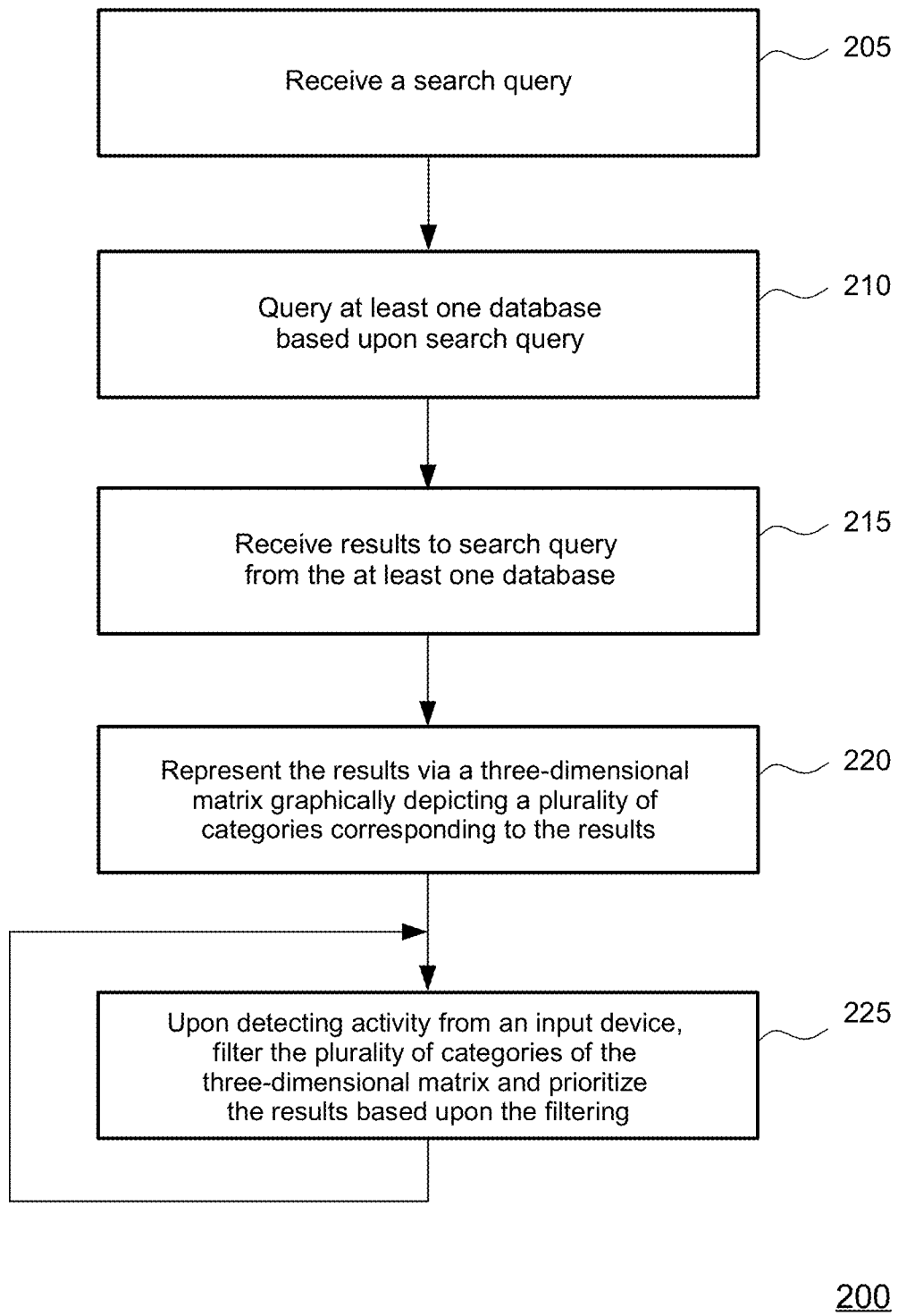
FIG. 2 illustrates a method of representing search results via a three-dimensional matrix, according to an embodiment.

FIG. 2 illustrates a method 200 of representing search results via a three-dimensional matrix, according to an embodiment. According to the method 200, a search tool associated with an online application (e.g., search tool 150 of server application 149) may process search results according to user preferences within a server system (e.g., server system 135) by filtering and prioritizing the results based on category filters. The category filters may be adjusted in response to user activity received from an input device (e.g., one or more of client I/O devices 123) associated with client application (e.g., client application 119).

The method 200 may begin at step 205, where the search tool may receive a search query. More specifically, the search tool may receive the search query from the client application via a communications network (e.g., network 165). At step 210, the search tool may query at least one database based upon the search query. More specifically, the search tool may submit a query to a DBMS (e.g., DBMS 153) in order to obtain a response from one or more databases (e.g., databases 159). At step 215, the search tool may receive results to the search query from the at least one database.

At step 220, the search tool may represent the results to the search query via a three-dimensional matrix. The three-dimensional matrix may graphically depict a plurality of categories corresponding to the results. One or more portions of the three-dimensional matrix may assume the form of a cube or rectangular prism. Additionally or alternatively, one or more portions of the three-dimensional matrix may assume the form of a non-rectangular shape. The search tool may present the three-dimensional matrix to the user of the client application via a client application interface (e.g., client application interface 120). Furthermore, the search tool may present one or more configuration settings associated with the three-dimensional matrix via the client application interface. Each of the plurality of categories depicted within the three-dimensional matrix may be associated with the results of the search query via a respective tag in the at least one database. Specifically, the search tool may use tags assigned to searchable components upon database entry in order to associate each of the plurality of categories to the results. In an embodiment, the search tool may create the three-dimensional matrix directly. According to an alternative embodiment, a rendering tool (e.g., rendering tool 152) may create the three-dimensional matrix and subsequently may relay the matrix to the search tool. According to a further alternative embodiment, a dedicated rendering application external to the server system (not shown in FIG. 1) may create the three-dimensional matrix and subsequently may relay the matrix to the search tool.

At step 225, upon detecting activity from the input device associated with the client application, the search tool may filter the plurality of categories of the three-dimensional matrix and may prioritize the results of the search query based upon the filtering. Activity from the input device may include one or more clicks of a mouse/touchpad or one or more keyboard selections by the user of the client application upon one or more configuration settings associated with the matrix and/or upon one or more portions within the matrix corresponding to respective categories among the plurality of categories. In addition to prioritizing the results of the search query, the search tool also may filter the results based upon the filtering of the plurality of categories. Step 225 may be repeated so long as the user reviews and interacts with the results.

According to an embodiment, in the context of representing the results to the search query via a three-dimensional matrix at step 220, the search tool may present the results in a list that is correlated to the three-dimensional matrix. The list may be presented to the user along with the three-dimensional matrix via the client application interface. Specifically, each of the results as presented in the list respectively may correspond to one or more categories depicted in the three-dimensional matrix. According to such embodiment, in the context of prioritizing the results based upon the filtering at step 225, the search tool may prioritize the list. In addition to prioritizing the list, the search tool also may filter the list based upon the filtering of the plurality of categories.

In an embodiment, in the context of filtering the plurality of categories of the three-dimensional matrix at step 225, the search tool may graphically de-emphasize a category relative to other categories among the plurality of categories. More specifically, the search tool may graphically de-emphasize such category in response to receipt of corresponding user input via the client application interface. For instance, via an input device the user may select a de-emphasis configuration setting on the client application interface and subsequently may select the category depicted within the matrix to de-emphasize.

Optionally, the client application interface may include an additional configuration setting to enable the user to designate an amount (e.g., a percentage) by which the search tool is to de-emphasize the selected category within the matrix. A default amount by which to de-emphasize the selected category may be designated in the event that the user does not designate an amount or in the event that the client application interface does not provide a configuration setting through which the user may designate an amount. Upon receiving user input regarding a category to de-emphasize via the input device, the search tool may de-emphasize the selected category within the matrix by the designated amount (either as designated by the user or as designated by default). The search tool may de-emphasize the selected category by decreasing the height (or otherwise decreasing the size) of a matrix portion corresponding to the selected category by the designated amount.

Additionally or alternatively, the client application interface may permit the user to directly indicate the designated amount by which the search tool is to de-emphasize the selected category within the three-dimensional matrix. Specifically, the client application interface may permit the user via the input device to select the matrix portion corresponding to the category to be de-emphasized and then manipulate movement of the input device a certain degree to provide the designated amount by which the search tool is to de-emphasize the selected category. For instance, if a user desires that a certain category be de-emphasized by 50%, the user may select via the input device the certain category depicted within the matrix in the client application interface, and subsequently the user may maintain selection of the certain category and perform a downward motion with the input device by a degree proportional to 50% to indicate that the certain category should be de-emphasized by 50% within the matrix. The search tool may update the matrix in response to such user input by decreasing the height (or otherwise decreasing the size) of the matrix portion corresponding to the certain category by 50%.

Furthermore, the client application interface optionally may provide a configuration setting to de-emphasize multiple categories simultaneously, in which case the search tool may de-emphasize multiple categories within the matrix simultaneously in response to the user selecting such setting. Additionally, according to such embodiment, in the context of prioritizing the results based upon the filtering at step 225, the search tool may order results associated with the de-emphasized category or categories after results associated with other categories.

In the event that a list is presented along with the three-dimensional matrix, the search tool may present results associated with the de-emphasized category or categories less prominently in the list than results associated with other categories (e.g., the search tool may list results associated with the de-emphasized category or categories after results associated with other categories). Furthermore, consequent to application of the de-emphasis filter, the list may include fewer results associated with the de-emphasized category relative to other categories, as determined by the designated amount. According to the above example in which the user desires that a certain category be de-emphasized by 50%, a list having the relevant results may include 50% fewer results associated with the certain category consequent to application to the de-emphasis filter.

In a further embodiment, in the context of filtering the plurality of categories of the three-dimensional matrix at step 225, the search tool may graphically emphasize a category relative to other categories among the plurality of categories. More specifically, the search tool may graphically emphasize such category in response to receipt of corresponding user input via the client application interface. For instance, via an input device the user may select an emphasis configuration setting on the client application interface and subsequently may select the category depicted within the matrix to emphasize.

Optionally, the client application interface may include an additional configuration setting to enable the user to designate an amount (e.g., a percentage) by which the search tool is to emphasize the selected category within the matrix. A default amount by which to emphasize the selected category may be designated in the event that the user does not designate an amount or in the event that the client application interface does not provide a configuration setting through which the user may designate an amount. Upon receiving user input regarding a category to emphasize via the input device, the search tool may emphasize the selected category within the matrix by the designated amount (either as designated by the user or as designated by default). The search tool may emphasize the selected category by increasing the height (or otherwise increasing the size) of a matrix portion corresponding to the selected category by the designated amount.

Additionally or alternatively, the client application interface may permit the user to directly indicate the designated amount by which the search tool is to emphasize a category within the three-dimensional matrix. Specifically, the client application interface may permit the user via the input device to select the matrix portion corresponding to the category to be emphasized and then manipulate movement of the input device a certain degree to provide the designated amount by which the search tool is to emphasize the selected category. For instance, if a user desires that a certain category be emphasized by 25%, the user may select via the input device the certain category depicted within the matrix in the client application interface, and subsequently the user may maintain selection of the certain category and perform an upward motion with the input device by a degree proportional to 25% to indicate that the certain category should be emphasized by 25% within the matrix. The search tool may update the matrix in response to such user input by increasing the height (or otherwise increasing the size) of the matrix portion corresponding to the certain category by 25%.

Furthermore, the client application interface optionally may provide a configuration setting to emphasize multiple categories simultaneously, in which case the search tool may emphasize multiple categories within the matrix simultaneously in response to the user selecting such setting. Additionally, according to such embodiment, in the context of prioritizing the results based upon the filtering at step 225, the search tool may order results associated with the emphasized category or categories prior to results associated with other categories.

In the event that a list is presented along with the three-dimensional matrix, the search tool may present results associated with the emphasized category or categories more prominently in the list than results associated with other categories (e.g., the search tool may list results associated with the emphasized category or categories prior to results associated with other categories). Furthermore, consequent to application of the emphasis filter, the list may include more results associated with the emphasized category relative to other categories, as determined by the designated amount. According to the above example in which the user desires that a certain category be emphasized by 25%, a list having the relevant results may include 25% more results associated with the certain category consequent to application to the emphasis filter.

According to a further embodiment, in the context of filtering the plurality of categories of the three-dimensional matrix at step 225, the search tool may focus display of the three-dimensional matrix upon a category among the plurality of categories and (optionally) any sub-categories associated with the category. More specifically, in response to receipt of corresponding user input via the client application interface, the search tool may focus display upon a particular category depicted in the three-dimensional matrix and optionally may display within the matrix sub-categories associated with the particular category. For instance, given a set of categories representing respective colors, via an input device the user may select a focus display configuration setting on the client application interface and subsequently may select a matrix portion corresponding to a particular color category. Upon selection of the focus display configuration setting and the matrix portion corresponding to the particular color category, the search tool may focus display upon the particular color category, which may entail partially or completely replacing the other color categories with the particular color category (and optionally any sub-categories of the particular color category) within the matrix. As another example, the user may select the focus display configuration setting on the client application interface and subsequently may select the category depicted within the matrix upon which to focus (i.e., upon which to "zoom"). Upon selection of the focus display setting and upon selection of the category upon which to focus, the search tool may focus display upon (e.g., "zoom in" on) the matrix portion corresponding to the selected category.

Furthermore, the client application interface optionally may provide a configuration setting to focus display upon multiple categories simultaneously, in which case the search tool may focus display upon multiple categories simultaneously in response to the user selecting such setting. Additionally, according to such embodiment, in the context of prioritizing the results based upon the filtering at step 225, the search tool may order results associated with the focused upon categories or categories and results associated with any respective sub-categories of the focused upon category or categories prior to results associated with other categories.

In the event that a list is presented along with the three-dimensional matrix, the search tool may present results associated with the focused upon categories or categories and results associated with any respective sub-categories of the focused upon categories or categories more prominently in the list than results associated with other categories (e.g., results associated with the focused upon categories or categories as well as results associated with any respective sub-categories of the focused upon categories or categories may be listed prior to results associated with other categories).

According to a further embodiment, in the context of filtering the plurality of categories of the three-dimensional matrix at step 225, the search tool may graphically adjust by a designated amount a category relative to other categories among the plurality of categories based upon a corresponding adjustment (e.g., an expansion or a limitation) of a range associated with the category. That is to say, the search tool may graphically adjust a category depicted within the matrix based upon an adjustment of a range associated with such category.

According to the embodiment with respect to range adjustment, the search tool may expand a range associated with a category (i.e., may increase an upper bound of a range and/or may decrease a lower bound of a range). More specifically, the search tool may expand a range of a quantitative value associated with such category (e.g., a range of a price value associated with a price-related category) in response to receipt of corresponding user input via the client application interface. For instance, via an input device the user may select a range expansion configuration setting on the client application interface and subsequently may select the category depicted within the matrix for which a range is to be expanded.

Optionally, the client application interface may include an additional configuration setting to enable the user to designate an amount by which the search tool is to expand the range associated with the selected category within the matrix. A default amount by which to expand the range associated with the selected category may be designated in the event that the user does not designate an amount or in the event that the client application interface does not provide a configuration setting through which the user may designate an amount. Upon receiving user input via the input device to expand the range associated with the selected category (either as designated by the user or as designated by default), the search tool may increase the size of a matrix portion corresponding to the selected category by the designated amount.

Additionally or alternatively, the client application interface may permit the user to directly indicate the designated amount by which the search tool is to expand the range associated with a category within the three-dimensional matrix. Specifically, the client application interface may permit the user via the input device to select the matrix portion corresponding to the category for which a range of a quantitative value is to be expanded and then manipulate movement of the input device a certain degree to provide the designated amount by which the search tool is to expand the range associated with the selected category. For instance, if a user desires that the range associated with a certain category be expanded by a given amount, via the input device the user may select the certain category depicted within the matrix, and subsequently the user may maintain selection of the certain category and perform an outward motion with the input device by a degree proportional to the given amount to indicate that the range associated with the certain category should be expanded by the given amount.

The search tool may update the matrix in response to such user input by increasing the size of the matrix portion corresponding to the certain category by the given amount.

Furthermore, according to the embodiment with respect to range adjustment, the search tool may limit a range associated with a category (i.e., may decrease an upper bound of a range and/or may increase a lower bound of a range). More specifically, the search tool may limit a range of a quantitative value associated with such category in response to receipt of corresponding user input via the client application interface. For instance, the user may select a range limitation configuration setting on the client application interface and subsequently may select the category depicted within the matrix for which a range is to be limited.

Optionally, the client application interface may include an additional configuration setting to enable the user to designate an amount by which the search tool is to limit the range associated with the selected category within the matrix. A default amount by which to limit the range associated with the selected category may be designated in the event that the user does not designate an amount or in the event that the client application interface does not provide a configuration setting through which the user may designate an amount. Upon receiving user input via the input device to limit the range associated with the selected category (either as designated by the user or as designated by default), the search tool may decrease the size of a matrix portion corresponding to the selected category by the designated amount.

Additionally or alternatively, the client application interface may permit the user to directly indicate the designated amount by which the search tool is to limit the range associated with a category within the three-dimensional matrix. Specifically, the client application interface may permit the user via the input device to select the matrix portion corresponding to the category for which a range of a quantitative value is to be limited and then manipulate movement of the input device a certain degree to provide the designated amount by which the search tool is to limit the range associated with the selected category. For instance, if a user desires that the range associated with a certain category be limited by a given amount, via the input device the user may select the certain category depicted within the matrix, and subsequently the user may maintain selection of the certain category and perform an inward motion with the input device by a degree proportional to the given amount to indicate that the range associated with the certain category should be limited by the given amount. The search tool may update the matrix in response to such user input by decreasing the size of the matrix portion corresponding to the certain category by the given amount.

According to the aforementioned embodiment with respect to range adjustment, the search tool otherwise may adjust a range associated with a category. For instance, the search tool may decrease an upper bound of a range and/or may decrease a lower bound of a range. Alternatively, the search tool may increase an upper bound of a range and/or may increase a lower bound of a range. The search tool may manipulate the size of the matrix portion within the three-dimensional matrix corresponding to the affected category according to such adjustments in ways analogous to those previously described.

Figure 3:
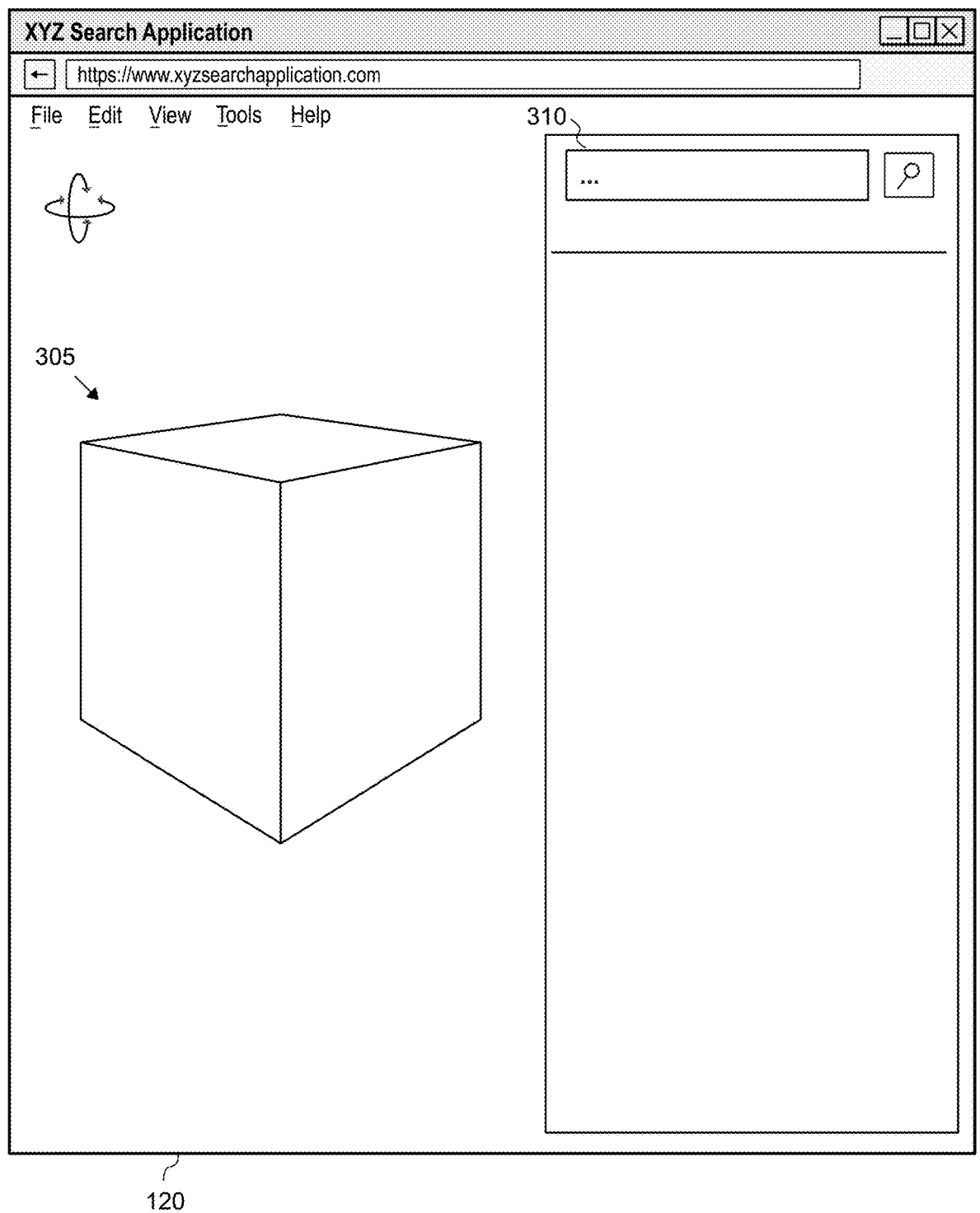
FIG. 3 illustrates a client application interface, according to an embodiment.

FIG. 3 illustrates client application interface 120 as presented by client application 119 running in memory 107 of client computing system 105, according to an embodiment. Online community interface 120 may include a three-dimensional matrix 305 and a search dialog box 310. Three-dimensional matrix 305 may accept activity from an input device associated with client computing system 105. Search dialog box 310 may accept a search query from the user of client computing system 105.

Figure 4:
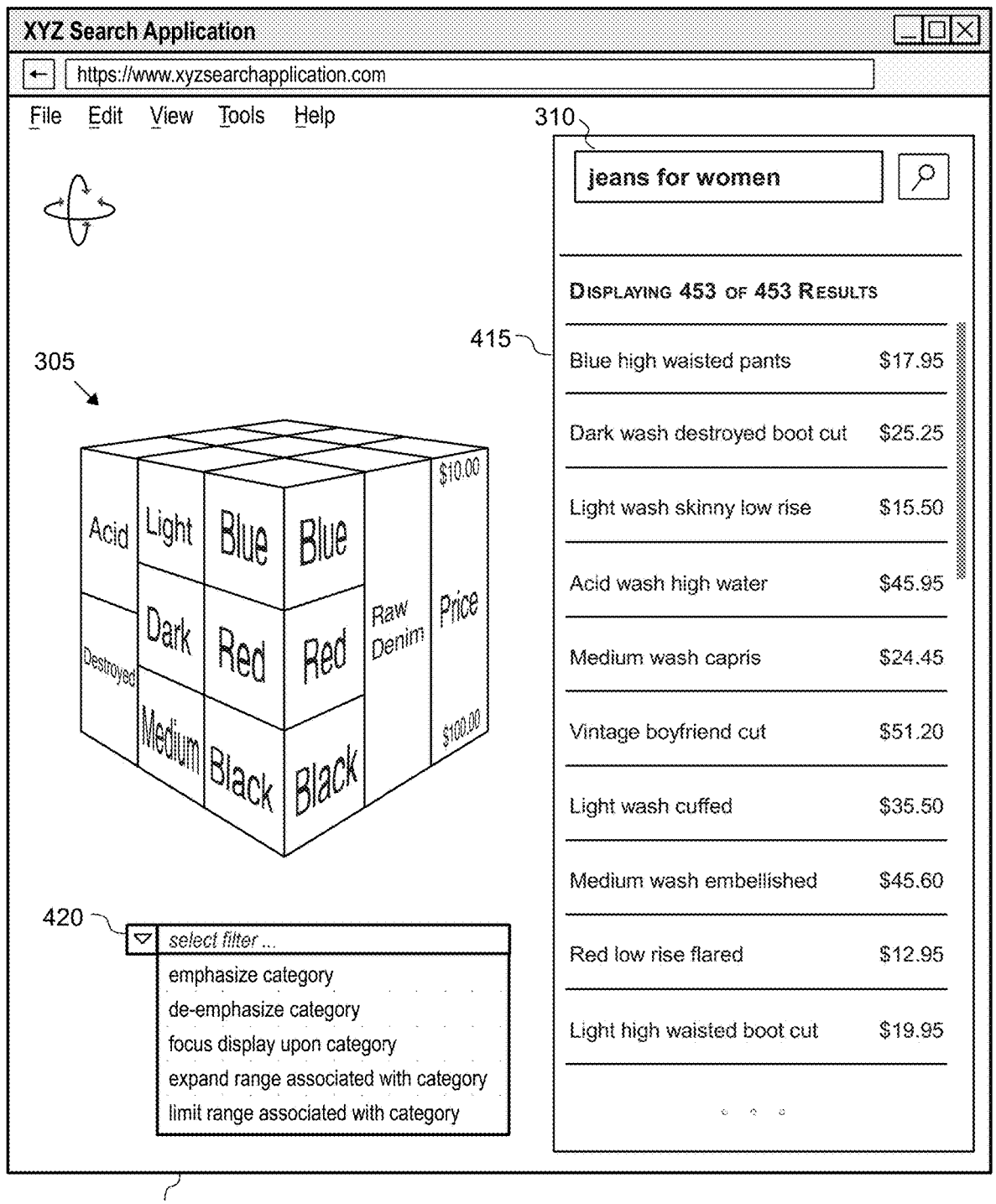
FIGS. 4-7C illustrate an example scenario of filtering and prioritizing search results via a three-dimensional matrix in the client application interface illustrated in FIG. 3, according to an embodiment.

FIGS. 4-7C illustrate an example scenario of filtering and prioritizing search results via a three-dimensional matrix in the client application interface illustrated in FIG. 3, according to an embodiment. As illustrated in FIG. 4, in response to a search query "jeans for women" provided in search dialog box 310, a list 415 may be provided within client application interface 120 including search results to the "jeans for women" query. Furthermore, three-dimensional matrix 305 may be populated with categories corresponding to the search results. Additionally, category filter dialog box 420 may be provided within client application interface 120. Category filter dialog box 420 may include various configuration settings for filtering the plurality of categories presented in three-dimensional matrix 305, including a de-emphasis configuration setting, an emphasis configuration setting, a focus display configuration setting, a range expansion configuration setting, and a range limitation configuration setting. The configuration settings provided in category filter dialog box 420 are not intended to be limiting; additional or alternative configuration settings for filtering the plurality of categories of three-dimensional matrix 305 may be included in the context of this example or other scenarios.

Figure 5A:
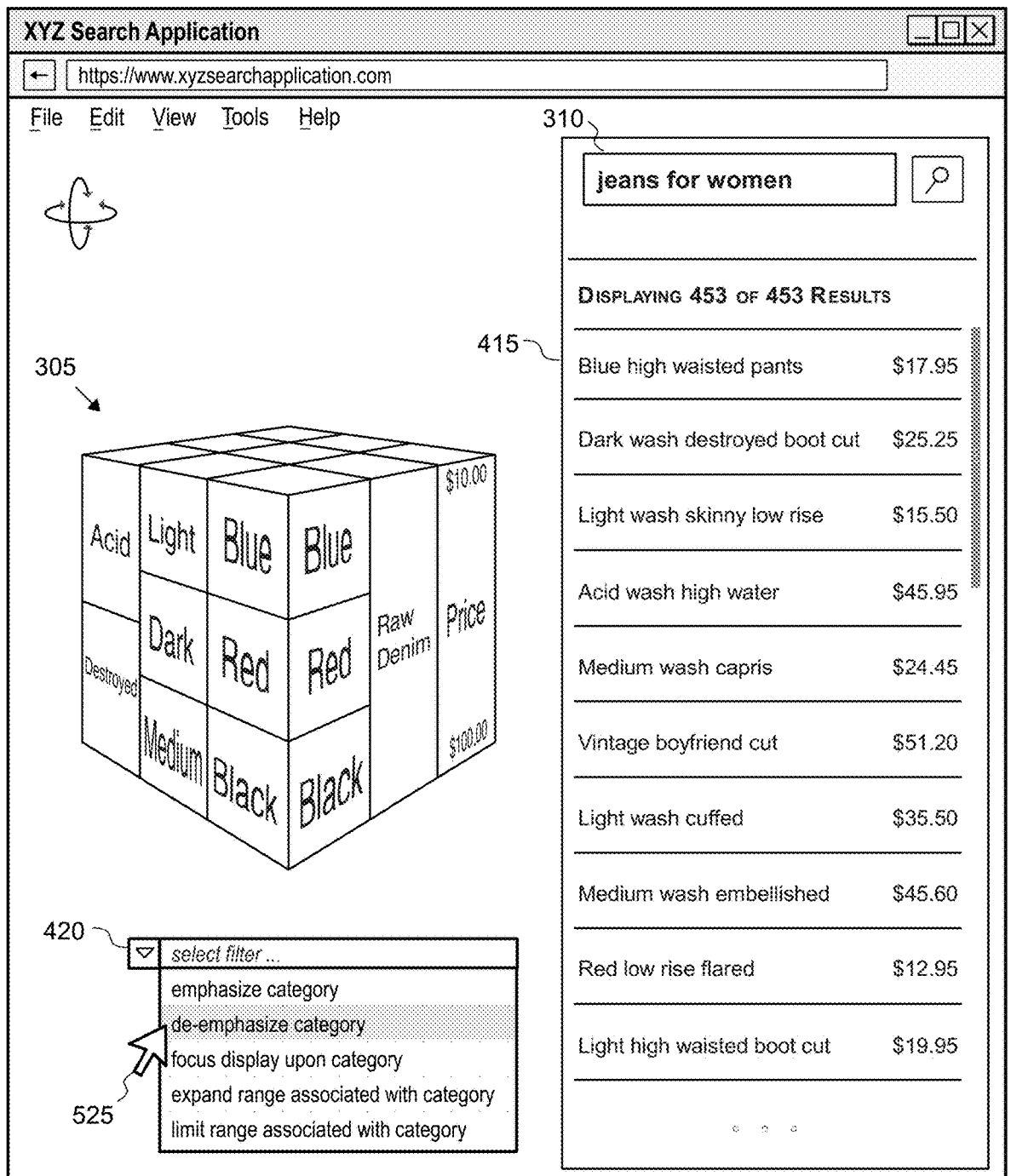
Figure 5B:
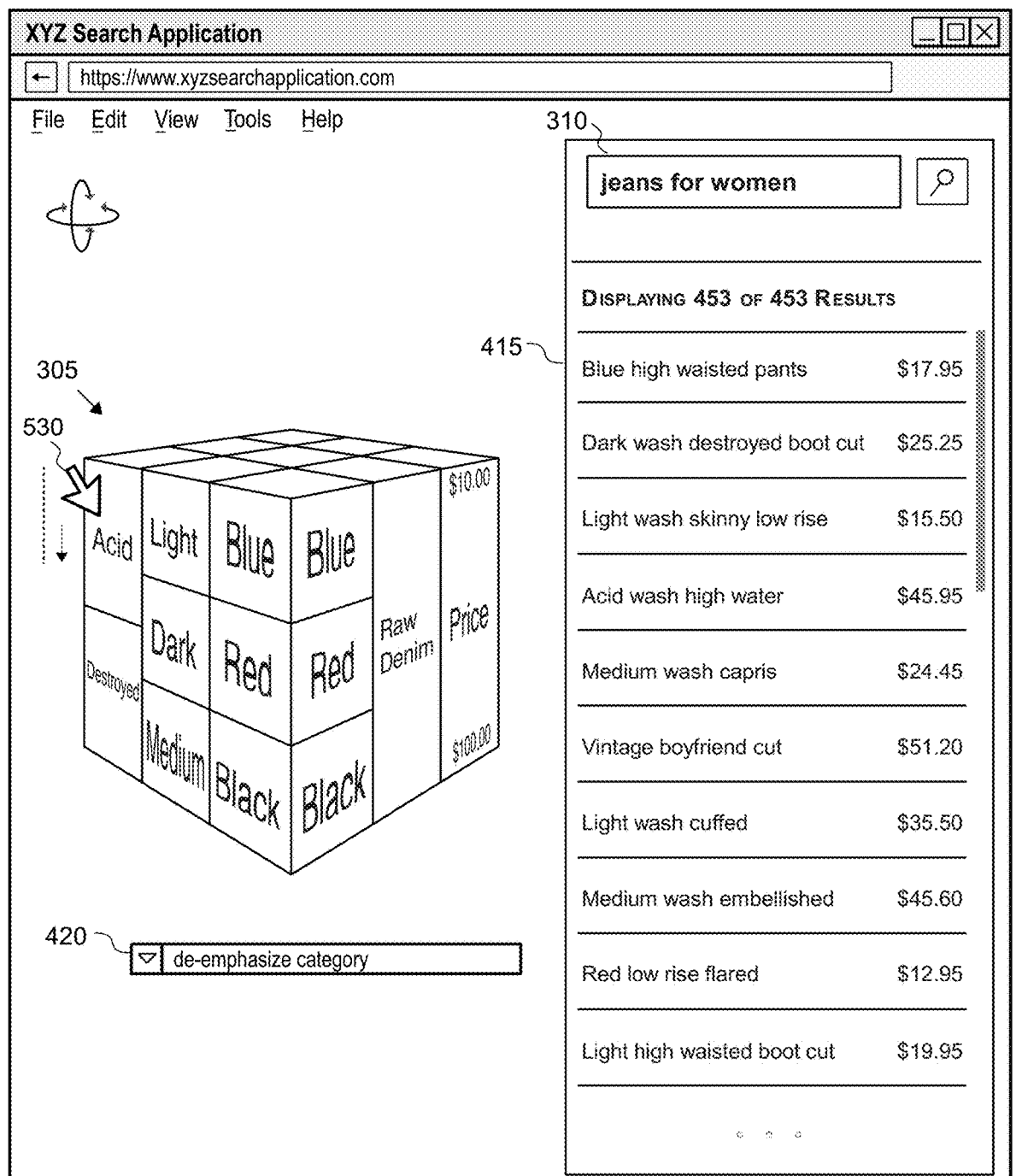
Figure 5C:
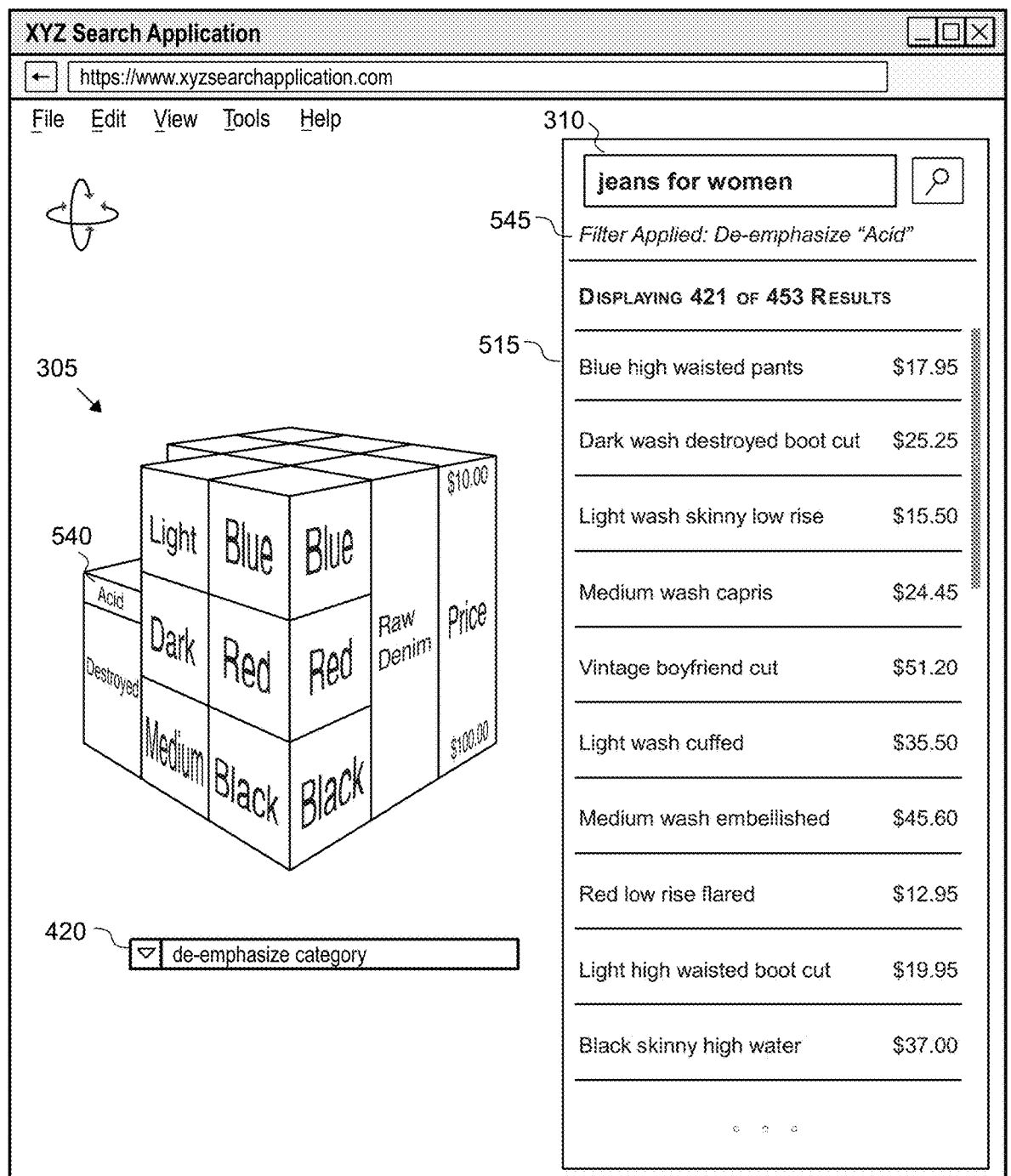

FIGS. 5A-5C illustrate application of a de-emphasis filter in client application interface 120. As illustrated in FIG. 5A, input device activity 525 (e.g., a mouse or a touchpad selection by the user) may result in the de-emphasis configuration setting being selected among the configuration settings provided via category filter dialog box 420. Then, as illustrated in FIG. 5B, input device activity 530 (e.g., a mouse or a touchpad selection and subsequent manipulation by the user) may result in selection of the "Acid" category within three-dimensional matrix 503. Via input device activity 530, the user may directly indicate a designated amount by which to emphasize the "Acid" category within the three-dimensional matrix 305. For purposes of this example, it is assumed that during input device activity 530 the user maintains selection of the "Acid" category and performs a downward motion with the input device by a degree proportional to 80% to indicate that the "Acid" category should be de-emphasized by 80% within the matrix. As illustrated in FIG. 5C, as a result of input device activity 525 and input device activity 530, the search tool may resize a portion 540 of three-dimensional matrix 305 corresponding to the "Acid" category to reflect the de-emphasis filter applied consequent to selection of the de-emphasis configuration setting. Furthermore, the search tool may present a list 515 that is prioritized and filtered based upon the de-emphasis configuration setting. More specifically, the portion of three-dimensional matrix 305 corresponding to the "Acid" category may be decreased in height, and the search results associated with the "Acid" category may be made less prominent in list 515. While a search result associated with the "Acid" category is listed near the top of list 415 ("Acid wash high water"), such search result is listed less prominently in list 515 and thus cannot be seen in FIG. 5. Moreover, consequent to application of the 80% de-emphasis filter, list 515 may include 80% fewer results associated with the "Acid" category than unfiltered list 415. As further illustrated in FIG. 5C, a status message 545 may be provided within client application interface 120 indicating application of the de-emphasis filter.

Figure 6A:
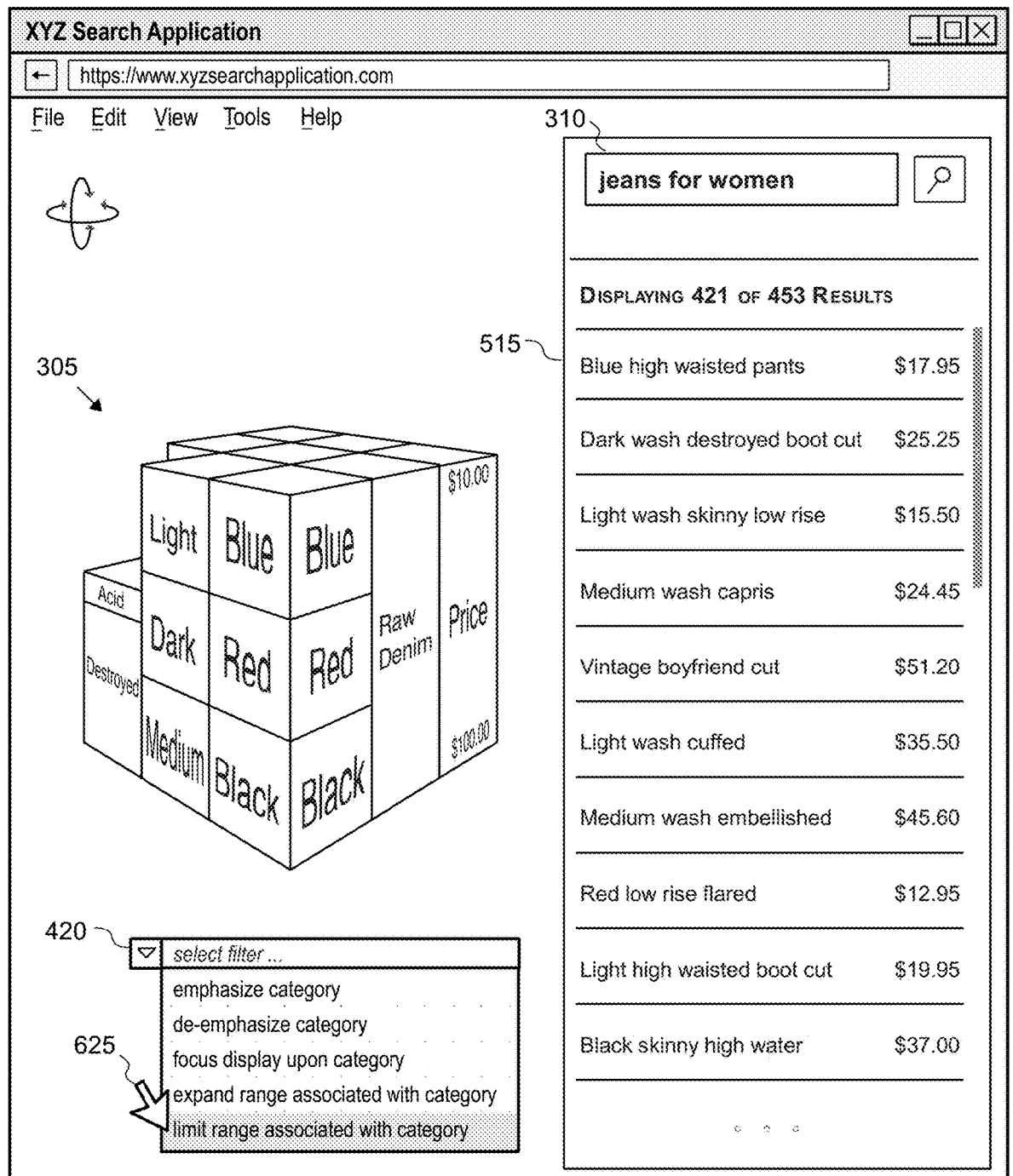
Figure 6B:
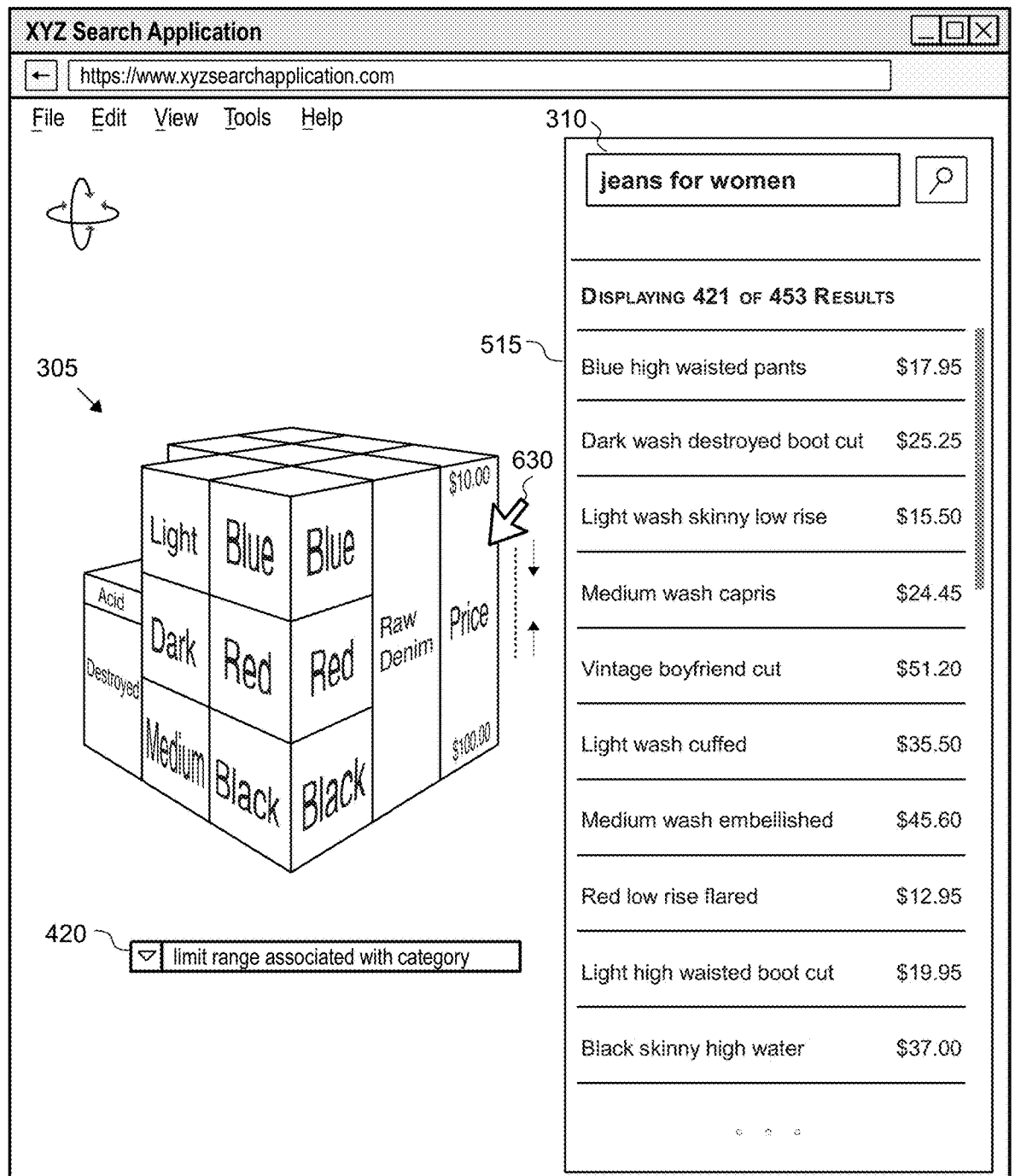
Figure 6C:
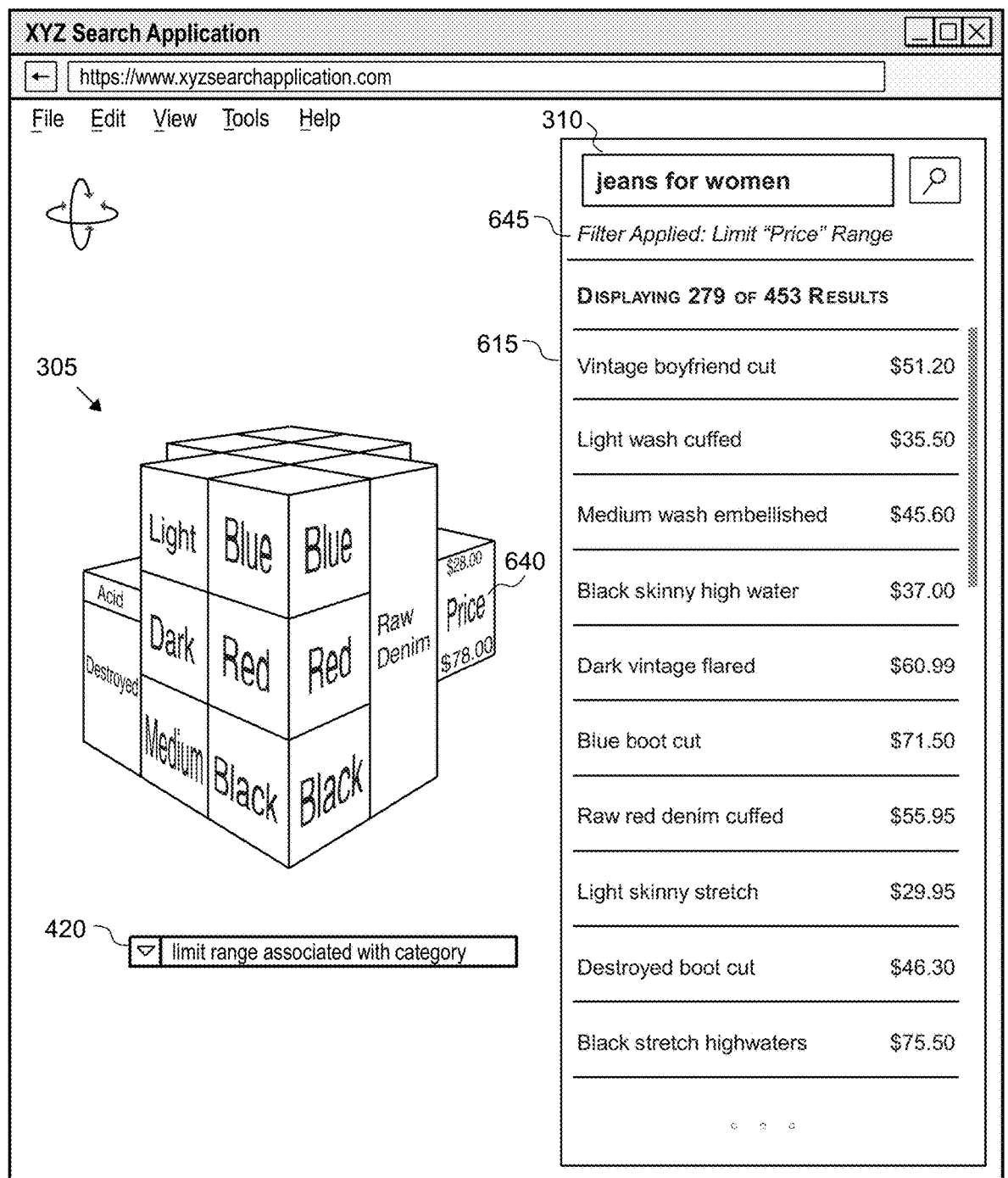

FIGS. 6A-6C illustrate application of a range limitation filter in client application interface 120. As illustrated in FIG. 6A, input device activity 625 (e.g., a mouse or a touchpad selection by the user) may result in the range limitation configuration setting being selected among the configuration settings provided via category filter dialog box 420. Then, as illustrated in FIG. 6B, input device activity 630 (e.g., a mouse or a touchpad selection and subsequent manipulation by the user) may result in selection of the "Price" category within three-dimensional matrix 503. Via input device activity 630, the user may directly indicate a designated amount by which to limit the range associated with the "Price" category within three-dimensional matrix 305. For purposes of this example, it is assumed that during input device activity 630 the user may select the "Price" category within three-dimensional matrix 305 via the input device, and subsequently the user may maintain selection of the "Price" category and perform an inward motion with the input device by a degree proportional to the amount by which the range associated with the "Price" category is to be limited. In this case, the user is assumed to have performed an inward motion with the input device to limit the price range associated with the "Price" category to $28.00-$78.00 from the original range of $10.00-$100.00. As illustrated in FIG. 6C, as a result of input device activity 625 and input device activity 630, the search tool may resize a portion 640 of three-dimensional matrix 305 corresponding to the "Price" category to reflect the range limitation filter applied consequent to selection of the range limitation configuration setting. Portion 640 reflects the newly limited range. Furthermore, the search tool may present a list 615 that is prioritized and filtered based upon the range limitation configuration setting. More specifically, the portion of three-dimensional matrix 305 corresponding to the "Price" category may be decreased in size to reflect a limited price range, and the search results may reflect the limited price range in list 615. Accordingly, search results in list 615 only reflect items within the price range as limited by application of the range limitation filter. As further illustrated in FIG. 6C, a status message 645 may be provided within client application interface 120 indicating application of the range limitation filter.

Figure 7A:
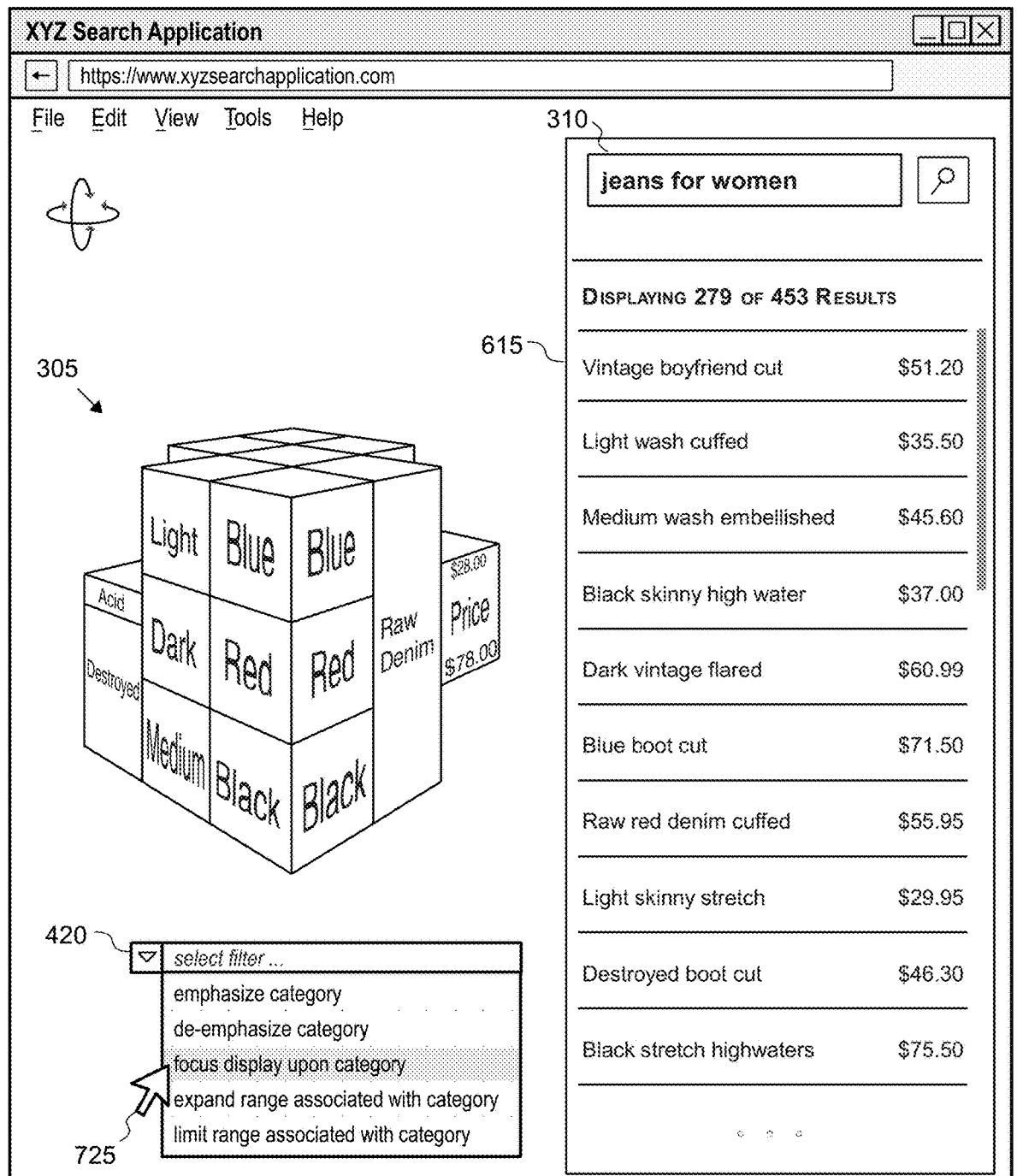
Figure 7B:
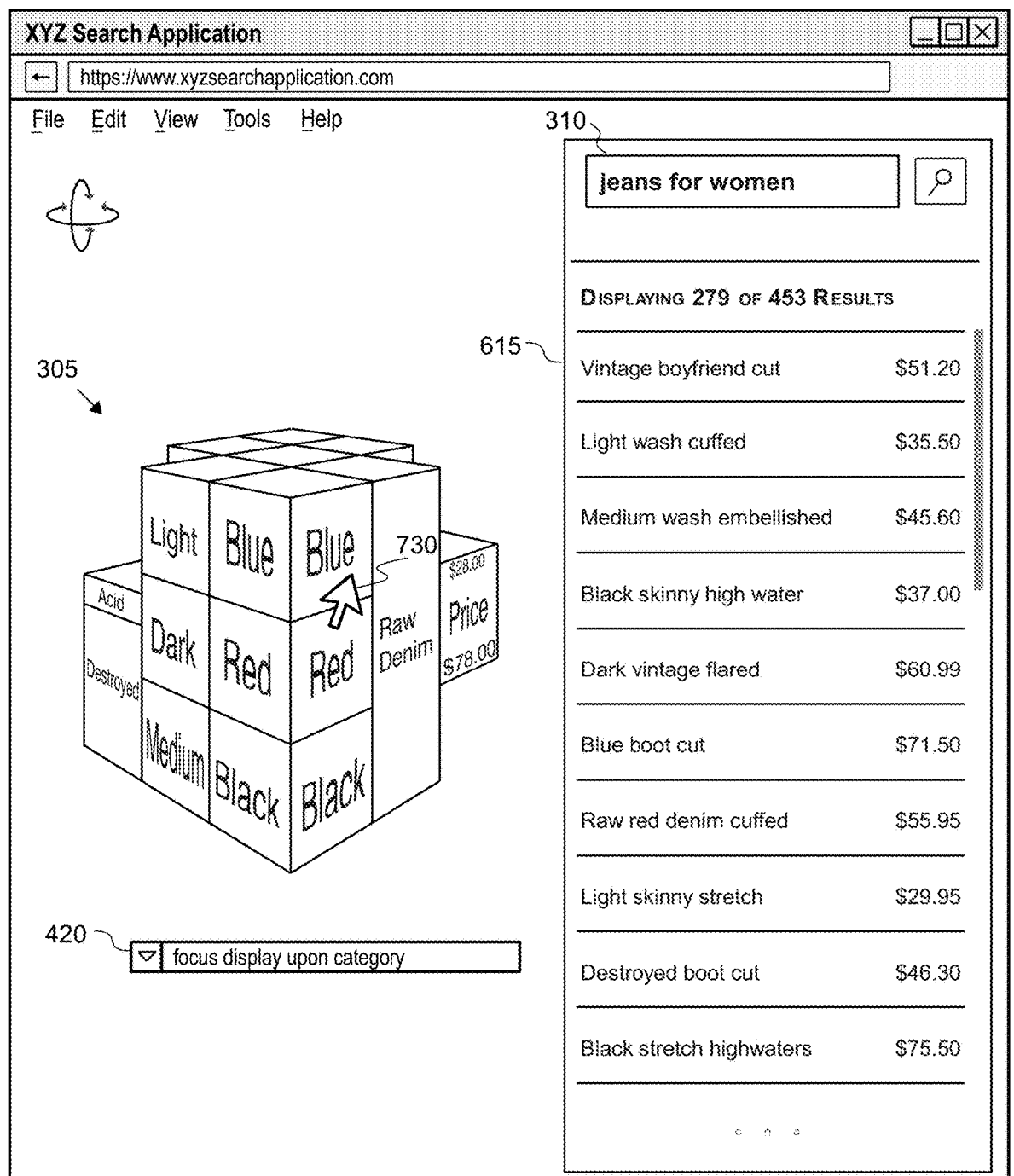
Figure 7C:
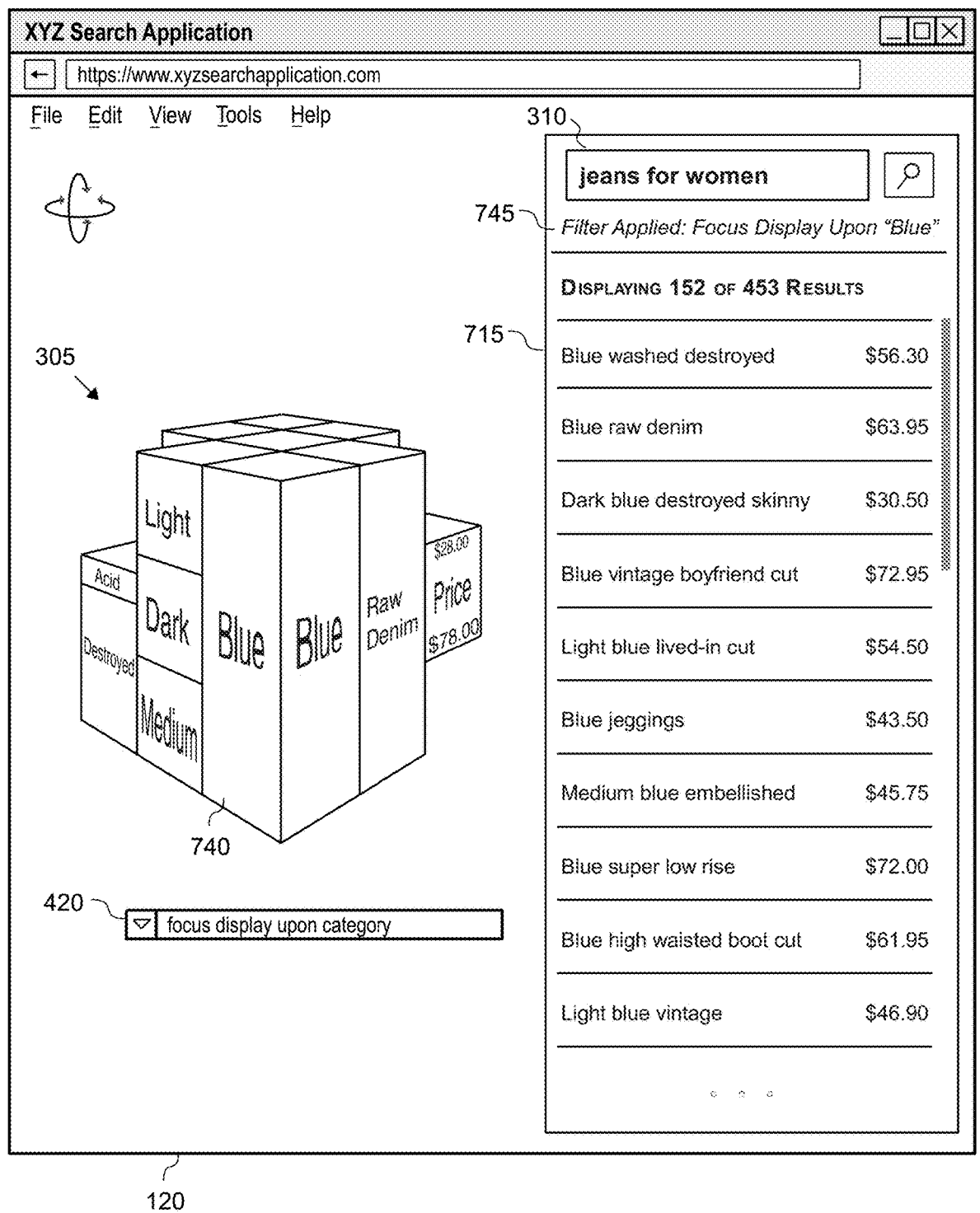

FIGS. 7A-7C illustrate application of a focus display filter in client application interface 120. As illustrated in FIG. 7A, input device activity 725 (e.g., a mouse or a touchpad selection by the user) may result in the focus display configuration setting being selected among the configuration settings provided via category filter dialog box 420. Then, as illustrated in FIG. 7B, input device activity 730 (e.g., a mouse or a touchpad selection) may result in selection of the "Blue" category within three-dimensional matrix 503. As illustrated in FIG. 7C, as a result of input device activity 725 and input device activity 730, the search tool may resize a portion 740 of three-dimensional matrix 305 corresponding to the "Blue" category to reflect the focus display filter applied consequent to selection of the focus display configuration setting. Furthermore, the search tool may present a list 715 that is prioritized and filtered based upon the focus display configuration setting. More specifically, the portion of three-dimensional matrix 305 corresponding to the "Blue" category may be increased in size in order to replace the other color categories within three-dimensional matrix 305, and the search results may reflect the focus upon the "Blue" category in list 715. Accordingly, search results in list 715 only reflect items associated with the "Blue" category (i.e., sub-categories of the "Blue" category). As further illustrated in FIG. 7C, a status message 745 may be provided within client application interface 120 indicating application of the focus display filter.

According to the various embodiments described herein, a search tool associated with an online application may graphically depict categories associated with search results three-dimensionally. Additionally, the search tool may filter the categories and prioritize the search results intuitively in response to user input.

While the foregoing description is directed to various embodiments, such description is not intended to limit the scope of the invention. All kinds of modifications made to the described embodiments and equivalent arrangements should fall within the protected scope of the invention. Hence, the scope of the invention should be explained most widely according to the claims that follow in connection with the detailed description, and should cover all the possibly equivalent variations and equivalent arrangements. Accordingly, further embodiments may be devised without departing from the basic scope of the invention.

What is claimed is:

1. A method comprising:
    querying at least one database based upon a search query received via a communications network;
    receiving results to the search query from the at least one database;
    presenting within an application interface a three-dimensional matrix that graphically depicts a plurality of categories corresponding to the results; and
    upon detecting input device activity including selection of a portion of the three-dimensional matrix corresponding to a certain category among the plurality of categories:
        filtering the plurality of categories of the three-dimensional matrix by emphasizing or de-emphasizing the certain category relative to other categories based upon respectively increasing size or decreasing size of the selected portion via the input device activity, and
        updating the results based upon the filtering.

2. The method of claim 1, wherein each of the plurality of categories is associated with the results via a respective tag in the at least one database.

3. The method of claim 1, wherein emphasizing or de-emphasizing the certain category relative to other categories comprises graphically adjusting based upon a corresponding adjustment of a range associated with the certain category.

4. The method of claim 1, wherein one or more portions of the three-dimensional matrix assume the form of a prism.

5. The method of claim 1, wherein respectively increasing size or decreasing size of the selected portion comprises respectively increasing height or decreasing height of the selected portion.

6. A computer program product comprising a computer readable storage medium having program instructions embodied therewith, the program instructions executable by a computing device to cause the computing device to:
    query at least one database based upon a search query received via a communications network;
    receive results to the search query from the at least one database;
    present within an application interface a three-dimensional matrix that graphically depicts a plurality of categories corresponding to the results; and
    upon detecting input device activity including selection of a portion of the three-dimensional matrix corresponding to a certain category among the plurality of categories:
        filter the plurality of categories of the three-dimensional matrix by emphasizing or de-emphasizing the certain category relative to other categories based upon respectively increasing size or decreasing size of the selected portion via the input device activity, and
        update the results based upon the filtering.

7. The computer program product of claim 6, wherein each of the plurality of categories is associated with the results via a respective tag in the at least one database.

8. The computer program product of claim 6, wherein emphasizing or de-emphasizing the certain category relative to other categories comprises graphically adjusting based upon a corresponding adjustment of a range associated with the certain category.

9. The computer program product of claim 6, wherein one or more portions of the three-dimensional matrix assume the form of a prism.

10. The computer program product of claim 6, wherein respectively increasing size or decreasing size of the selected portion comprises respectively increasing height or decreasing height of the selected portion.

11. A system comprising:
    a processor; and
    a memory storing an application program, which, when executed on the processor, performs an operation comprising:
        querying at least one database based upon a search query received via a communications network;
        receiving results to the search query from the at least one database;
        presenting within an application interface a three-dimensional matrix that graphically depicts a plurality of categories corresponding to the results; and
        upon detecting input device activity including selection of a portion of the three-dimensional matrix corresponding to a certain category among the plurality of categories:
            filtering the plurality of categories of the three-dimensional matrix by emphasizing or de-emphasizing the certain category relative to other categories based upon respectively increasing size or decreasing size of the selected portion via the input device activity, and
            updating the results based upon the filtering.

12. The system of claim 11, wherein each of the plurality of categories is associated with the results via a respective tag in the at least one database.

13. The system of claim 11, wherein emphasizing or de-emphasizing the certain category relative to other categories comprises graphically adjusting based upon a corresponding adjustment of a range associated with the certain category.

14. The system of claim 11, wherein one or more portions of the three-dimensional matrix assume the form of a prism.

15. The system of claim 11, wherein respectively increasing size or decreasing size of the selected portion comprises respectively increasing height or decreasing height of the selected portion.

* * * * *